United States Patent
Bartus (10) Patent No.: US 11,994,172 B2
(45) Date of Patent: May 28, 2024

(54) LINEAR DRIVE WITH CLUTCH

(71) Applicant: DewertOkin KFT, Kecskemét (HU)

(72) Inventor: Péter Bartus, Tiszaalpár (HU)

(73) Assignee: DEWERTOKIN KFT, Kecskemét (HU)

( * ) Notice: Subject to any disclaimer, the term of this patent is extended or adjusted under 35 U.S.C. 154(b) by 216 days.

(21) Appl. No.: 17/596,556

(22) PCT Filed: Jun. 10, 2020

(86) PCT No.: PCT/EP2020/066093
§ 371 (c)(1),
(2) Date: Apr. 4, 2022

(87) PCT Pub. No.: WO2020/249617
PCT Pub. Date: Dec. 17, 2020

(65) Prior Publication Data
US 2022/0268323 A1    Aug. 25, 2022

(30) Foreign Application Priority Data

Jun. 14, 2019    (DE) ............... 20 2019 103 359.2

(51) Int. Cl.
*F16H 25/20*    (2006.01)
*F16D 11/14*    (2006.01)
(Continued)

(52) U.S. Cl.
CPC ........... *F16D 23/14* (2013.01); *F16D 11/14* (2013.01); *F16D 2023/123* (2013.01); *F16H 2025/2084* (2013.01); *F16H 2025/209* (2013.01)

(58) Field of Classification Search
CPC .... F16D 11/14; F16D 23/14; F16D 2023/123; F16H 2025/2084; F16H 2025/209
See application file for complete search history.

(56) References Cited

U.S. PATENT DOCUMENTS 6,240,800 B1    6/2001    Bokaemper et al.
9,074,659 B2    7/2015    Wu
(Continued)

FOREIGN PATENT DOCUMENTS

EP    0968675    5/1999
WO    2019091997    5/2019

OTHER PUBLICATIONS

International Preliminary Report on Patentability from corresponding PCT Appln. No. PCT/EP2020/066093, dated Dec. 14, 2021.
(Continued)

*Primary Examiner* — Randell J Krug
(74) *Attorney, Agent, or Firm* — Grossman, Tucker, Perreault & Pfleger, PLLC (57) ABSTRACT

A linear drive having a transmission housing and an electric motor which is accommodated in the transmission housing and drives a shaft with a worm. The shaft meshes with a worm gear which is non-rotatably connectable to a clutch to a spindle holder non-rotatably connected to a spindle. The clutch is biased by a spring and is adjustable by a clutch actuation. The clutch actuation includes a slide element which bears against the clutch and which is arranged non-rotatably but axially displaceably. A rotary element which is axially fixed but rotatable about an axis of rotation engages the slide element at an outside that faces away from the clutch. Run-on bevels of complementary configuration are provided between the slide element and the rotary element. The rotary element is actuable by a pulling element, and the slide element is axially displaceably in relation to the rotary element.

18 Claims, 6 Drawing Sheets

(51) Int. Cl.
*F16D 23/14* (2006.01)
*F16D 23/12* (2006.01)

(56) References Cited

U.S. PATENT DOCUMENTS

2014/0312724 A1   10/2014  Hung
2015/0135865 A1    5/2015  Oberndoerfer
2017/0331350 A1* 11/2017  Sørensen ............... A61G 7/015

OTHER PUBLICATIONS

International Search Report from corresponding PCT Appln. No. PCT/EP2020/066093, dated Sep. 17, 2020.

* cited by examiner

LINEAR DRIVE WITH CLUTCH

FIELD

In general the invention concerns a linear drive, in particular for adjustment of a piece of furniture, a sick bed or the like, comprising an electric motor which by way of a transmission adjusts a lift tube relatively moveably with respect to a stationary guide tube and thus increases and reduces the length of the linear drive in order for example to adjust the piece of furniture, sick bed or the like.

More specifically the invention concerns a linear drive comprising a transmission drivable by way of an electric motor, an electric motor which is connected to the transmission housing and in particular is accommodated in a motor housing and which drives a shaft with a worm or is provided at the end with a worm which in turn meshes with a worm gear. That worm gear can be non-rotatably connected to a spindle holder and can be released therefrom by way of a clutch. A spindle is non-rotatably accommodated in the spindle holder. A spindle nut runs on the spindle, the spindle nut being displaceable longitudinally displaceably in a guide tube between a retracted rear end position and an extended front end position and being connected to a lift tube. That lift tube is connected also like the transmission housing to an article of furniture or another item and can thus be adjusted by adjustment or longitudinal displacement of the moveable lift tube in relation to the stationary guide tube to pivot two components relative to each other. Particularly preferably such a linear drive is used for the adjustment of sick beds, wherein the linear drive is fixed beneath a frame of a bed or to the frame of a bed, in particular with a dog clutch at the rear end of the transmission housing and the lift tube is articulated to a head or foot part which are adjustable with respect to the stationary frame from a laid-down position into a folded position.

In the rest position the clutch is in the coupled state and is therefore held by a spring in the coupled position in which the clutch connects the worm gear to the spindle holder and thus transmits the torque from the worm gear to the spindle holder and thus to the spindle. Usually the connection is implemented by way of profile structures which are provided pair-wise in complementary relationship on the worm gear and the spindle holder, in particular in the form of splined shaft structures with a profile structure of complementary configuration at the inside of the clutch, that therefore non-rotatably interconnects the worm gear and the spindle holder.

BACKGROUND

For linear drives of that kind it is sometimes necessary for them to have to be released from the coupled position, sometimes even relatively quickly and in the short term, for example because a patient has to be quickly treated in an emergency situation and for that purpose the head or the foot end of the bed has to be lowered. The clutch according to the invention serves for that purpose, and in that respect can also be referred to as an emergency clutch. By actuation of the clutch which uncouples the clutch against the spring force the non-rotatable connection between the spindle nut and the spindle holder is interrupted so that a free movement is provided and the bed or the pivotably mounted foot or head part can be instantly lowered.

STATE OF THE ART

A clutch of that kind is known for example from international patent application number WO 2014/005913 to the present applicant. In this design the worm gear includes injection-molded claws for forming a shaped part and has a smooth inside surface. The worm gear has a splined shaft formed laterally thereon while provided on the spindle holder is a flange with a spline structure of corresponding configuration. The clutch is spring-loaded and in the rest position is urged by the splined shaft on the worm gear on to the spline structure of corresponding configuration on the spindle holder so that they are non-rotatably connected.

The clutch is actuated by way of a rotary knob which is arranged on the transmission housing and which adjusts an entrainment member by way of an eccentric. That entrainment member engages by means of pins into an externally peripherally extending groove of the clutch. By rotation of the knob, by means of the eccentric, the clutch is transferred from the coupled rest position into the uncoupled free-running position. In the rest state the clutch connects the worm gear non-rotatably to the spindle holder and is thus engaged.

Disadvantages in the State of the Art

A disadvantage with that configuration is complex actuation by way of a rotary mechanism or by way of a rotary knob with an eccentric. Accordingly it is necessary to grip that rotary knob in the proximity of the transmission housing in order to produce emergency release of the clutch in the emergency situation. That can sometimes be problematical because of access, in particular in urgent situations, that is to say in an emergency case.

In addition the actuating mechanism is arranged substantially laterally beside the transmission housing, which makes the construction and assembly relatively complex.

SUMMARY

Taking the above-mentioned state of the art and the disadvantages involved therewith as the basic starting point therefore the object of the invention is to at least partially avoid those disadvantages and in particular provide a linear drive which permits particularly simple and rapid operation of the clutch, more specifically even from different regions of the bed.

Invention

According to the invention that object is already attained by the features of the independent claims. Advantageous developments which however are not obligatory are recited in the appendant claims.

In the simplest configuration that object or the technical problem involved is thus already attained in that the clutch element has two clamping elements which are rotatable relative to each other about a common axis of rotation and between which a steep thread or run-on bevels is provided and that there is provided a pulling means with which the clamping elements are rotable in relation to each other about the common axis of rotation.

In that arrangement the axis of rotation extends in the longitudinal direction of the clutch, that is usually arranged coaxially with the longitudinal axis of the spindle and thus the entire linear drive. The configuration according to the invention therefore means that lateral access to the clutch is no longer necessary and rather is replaced by clutch actuation arranged axially along the longitudinal axis of the clutch, including the two clamping elements which are rotatable relative to each other with run-on bevels which are provided between them and which bear against each other. That clutch actuation therefore includes the two clamping elements which are rotatable relative to each other, wherein a first in the installed position is arranged internally and bears against or directly actuates the clutch. That first clamping element is arranged axially displaceably and non-rotatably and is therefore referred to as a slide element. The second clamping element is arranged externally of the slide element and is therefore spaced from the clutch by way of the slide element and is rotatable about the axis of rotation but is arranged axially fixed, for which reason it is referred to as the rotary element. Provided between the slide element and the rotary element are run-on bevels which in the installed position bear against each other and which have preferably complementary slopes of about 45 degrees and the axial displacement upon rotation can be determined as desired by the slope angle. Rotation of the rotary element therefore causes axial displacement of the slide element by the run-on bevels of the two clamping elements running against each other. Accordingly the slide element is axially displaced along the longitudinal axis of the clutch, bears internally against the clutch and thus disengages same from the clutch which is biased into the rest position by a spring, for the free-running or emergency displacement in which the clutch releases the spindle holder for the emergency actuation.

That configuration has crucial advantages. On the one hand it is very compact because, being linearly oriented, it can be easily integrated into the end of the housing and does not have to have any radially operative levers, sliders or other mechanisms which laterally increase the structural space required by the housing or the linear drive.

Particularly preferably the clutch is arranged in the rear end of the linear drive.

Preferably the clutch and the clutch actuation, that is to say the two clamping elements which run against each other, have a corresponding or similar external geometry or are geometrically matched to each other.

A particularly preferred configuration is in the form of a cylindrical, in particular hollow-cylindrical component of at least the same outside diameter. Preferably that outside diameter is geometrically matched to the inside diameter of a fork head.

Preferably the slide element and the rotary element of the clutch actuation are hollow-cylindrical or ring-shaped so that it can be fitted on to or at the clutch in particular from the rear in embracing or enclosing relationship on the outside thereof. Preferably the slide element is in the form of a hollow-cylindrical slide ring and the rotary element is in the form of a hollow-cylindrical rotary ring.

Preferably the rotary element includes at least one pulling means holder for inserting or fixing a pulling means, particularly preferably a Bowden cable, in which cable thimbles of pulling cables can be fitted.

In a preferred embodiment the outer rotary ring externally includes two such pulling means holders in diametrally opposite relationship. Particularly preferably those holders are rotatably fitted to the outer peripheral surface of the second clamping ring and are preferably in the form of rotatably fitted cable receiving means. For planar termination of the rotary ring with the adjoining join partner, in particular a fork head, the rotary ring can have recesses, the size of which is matched at least to the fixing portion of the pulling means holder.

A particularly compact configuration of the invention makes it possible for the first time for the clutch and the clutch actuation to be arranged at least partially accommodated in a fork head. For that purpose the fork head preferably has an adapter-like, hollow-cylindrical receiving connecting piece which extends forwardly away from the actual end of the fork head with the forks and is adapted to receive the clutch actuation and possibly also at least parts of the clutch.

To increase stability that fork head in a preferred embodiment can also be partially accommodated in the transmission housing or can be installed therein.

In the preferred embodiment the receiving connecting piece of the fork head has at least one feed opening for feeding a cable or Bowden cable. Preferably that feed opening is provided at the end of an entry connecting piece which extends tangentially laterally from the outer peripheral surface of the fork head and which thus extends transversely to the longitudinal axis of the fork head tangentially at the outer cylindrical peripheral surface of the hollow-cylindrical receiving connecting piece for receiving the clutch actuation and in which a Bowden cable holder or a fixing for the Bowden cable is accommodated on the rotary ring. In the preferred embodiment the Bowden cable holder has receiving means which project out of the entry connecting piece and into which a cable thimble at the end of a Bowden cable can be inserted.

In the particularly preferred embodiment the fork head has two diametrally oppositely disposed entry connecting pieces for receiving Bowden cable holders which project in diametrally opposite relationship tangentially laterally from the peripheral surface of the preferably cylindrical fork head. In that way emergency release of the clutch can be actuated for example from both sides of a sick bed by means of a separate pulling means.

The proposed linear drive is preferably used as a furniture drive, particularly preferably for the displacement of a pivotable head or foot part of a sick bed. It will be appreciated by the man skilled in the art that it can be used generally for the displacement of mechanical devices of any kind, in particular for the displacement of a moveable component in relation to a stationary component.

Particularly compact mounting for the spindle holder in a small structural space can be achieved in that the spindle holder has a bearing seat on which an inner race of a bearing sits, and an outer race of that bearing sits in a bearing seat of a bearing holder which mounts the bearing in the fork head or also in the transmission housing.

The bearing holder therefore has at a front side facing towards the bearing a bearing seat for enclosingly receiving the outer race of the bearing and at a rear end facing away from the bearing it has a connecting region for fixing to the receiving joining partner, preferably the inside of a fork head, wherein that connecting region can be of reduced dimensions relative to the bearing seat in order to be able to easily assemble it. In the particularly preferred embodiment provided between the joining partner and the bearing holder are pins and ribs which in the installed position engage into each other in such a way that the precise rotary angle orientation of the bearing holder along the longitudinal axis of the clutch arrangement is irrelevant, that is to say it can be easily assembled in any orientation position.

Preferably that bearing seat of the bearing holder includes an axial abutment which acts axially on the bearing in order in that way to be able to function as a fixed bearing.

Preferably the bearing seat of the bearing holder has a bearing step adapted to support or receive the outer race of the bearing both at the outside and also at the end.

The bearing seat of the bearing holder can be in the form of a peripherally closed structure, for example a pot-shaped structure, which at an end which is the front end in the installed position has the bearing step for receiving the outer race of the bearing.

For optimizing structural space however it can also be provided that the bearing seat is not in the form of a peripherally close structure but rather has bearing fingers which are spaced from each other in the peripheral direction and which form intermediate spaces between them. Those bearing fingers can fit or engage into bearing finger recesses of complementary configuration at the rear end of the slide element of the clutch actuation.

In the preferred embodiment the bearing holder therefore includes a bearing seat for the outer race of the bearing which preferably includes the step which engages the outer race in the installed position both at the outside and therefore also at the end for providing a fixed/moveable bearing arrangement. That bearing seat of the bearing holder is preferably adjoined by a connecting region with which the bearing holder is connected to the receiving joining partner, for example the fork.

The bearing holder can be fitted in a particularly simple fashion in virtually any desired rotary angle orientation in a receiving connecting piece of the fork head if the connecting region of the bearing holder includes a plurality of transverse struts which extend transversely relative to the longitudinal axis of the bearing holder, with intermediate spaces provided between them, into which pins at the inside of the end of the fork head engage.

The configuration according to the invention of the bearing holder thus makes it possible for the bearing holder to bridge over the region behind the end of the spindle holder and the rear wall of the fork head, with the bearing holder being fixed or mounted in the fork head at the rear wall thereof.

The bearing seat can be in the form of a peripherally closed ring with an external step at the end for forming the axial abutment.

Particularly compact integration of the bearing holder into the clutch actuation can be achieved if the bearing holder is not in the form of a peripherally closed configuration but the ring of the bearing seat with the external step is peripherally interrupted a plurality of times to form a plurality of peripherally mutually spaced bearing fingers which together form the bearing seat for receiving the outer race of the bearing, in particular of the ball bearing.

Those bearing fingers can now engage into corresponding bearing finger recesses at the outside of the slide element, that faces towards the rotary element, so that the slide element of the clutch actuation can therefore be displaced around those bearing fingers.

In the preferred embodiment the bearing holder includes six peripherally spaced bearing fingers which engage into slot-like bearing finger recesses of complementary configuration at the outside of the slide element.

Accordingly the proposed bearing holder in the installed position is enclosed by or embraced by the clutch actuation.

Preferred embodiments include the clutch being in the form of a clutch sleeve, that is to say a round or hollow-cylindrical component having an internal profile structure adapted to a complementary profile structure of the worm gear and the spindle holder to connect them together in non-rotary relationship in the coupled position, that is to say to provide a positively locking connection.

In the preferred embodiment that profile structure at the inside of the clutch is in the form of a splined shaft structure which is complementary to a splined shaft on the worm gear and a splined shaft on the spindle holder, that is to say cooperates in coupled relationship therewith and transmits the torque from the worm gear to the spindle holder. Preferably the spindle holder has a splined shaft flange projecting radially at the end beyond a central hollow-cylindrical receiving portion extending along the longitudinal axis for non-rotationally receiving the spindle. That splined shaft flange at an inside that faces towards the worm gear has a splined shaft structure which is complementary to the clutch and which in that respect also corresponds to the splined shaft structure of the worm gear.

For cost reasons the substantial parts of the linear drive comprise plastic, in particular the housing portions, but also most transmission parts. Only the spindle and the worm comprise steel for strength reasons.

The non-rotational connection between the spindle holder and the spindle is effected either by way of a press fit or by way of clamping pins which are inserted at the end between the spindle and the spindle holder into end notches in the spindle.

Preferably the transmission housing is divided or is adapted to be divisible. Preferably it includes a first housing portion, in particular adapted to receive the electric motor, and a second housing portion which can be releasably connected to the first housing portion. Preferably the housing portions bear against each other at a separation plane. In a splash water-protected embodiment provided at the joining or separation plane is a peripherally extending joining flange having a sealing element provided thereon, which preferably includes a sealing groove and a sealing projection or lip of complementary configuration thereto, which engage sealingly into each other in the installed position and thus seal off the join between the housing portions.

Further features and advantages of the invention will be apparent from the specific description hereinafter of preferred embodiments with reference to the accompanying drawings.

In this respect directional terminology like for example "upward", "downward", "forward", "rearward", "front", "rear" and so forth is used in relation to the orientations of the Figure or Figures being described. As components of embodiments can be positioned in a number of differing orientations the directional terminology serves for illustration and is in no way limiting. It will be appreciated that other embodiments can be used and structural or logical modifications can be made without thereby departing from the scope of protection of the present invention. The following detailed description is not to be interpreted in a limiting sense. In the context of this description the terms "connected", "joined" and "integrated" are used to describe both a direct and also an indirect connection, a direct or indirect join or direct or indirect integration. Identical or similar components are denoted by identical references in the Figures insofar as that is desirable. The views in the Figures are substantially true to scale.

However certain regions can be shown on an enlarged scale as will be apparent to the man skilled in the art to illustrate details. In addition the drawings can be strikingly simplified and do not contain every detail which is possibly present in a practical implementation.

Unless otherwise specified the indefinite article and the definite article refer not just to an individual component but are to be interpreted as "at least one". The terminology includes the above-mentioned words, deviations therefrom and similar meanings. It should further be appreciated that the terms "approximately", "substantially" and similar terms in connection with the dimensions and a property of a component of the invention describe the described dimension and property not as a strict limit or parameter and do not exclude minor deviations therefrom, that are functionally similar. At least parts of description with numerical parameters also include variations in those parameters in accordance with mathematical and manufacturing principles in the state of the art, for example roundings, deviations and other systematic errors, manufacturing tolerances and so forth.

BRIEF DESCRIPTION OF THE DRAWINGS

Finally in relation to a plurality of identical components or elements, for reasons of clarity, only a respective one is denoted by a reference numeral.

In the drawings.

DETAILED DESCRIPTION

Figure 1:
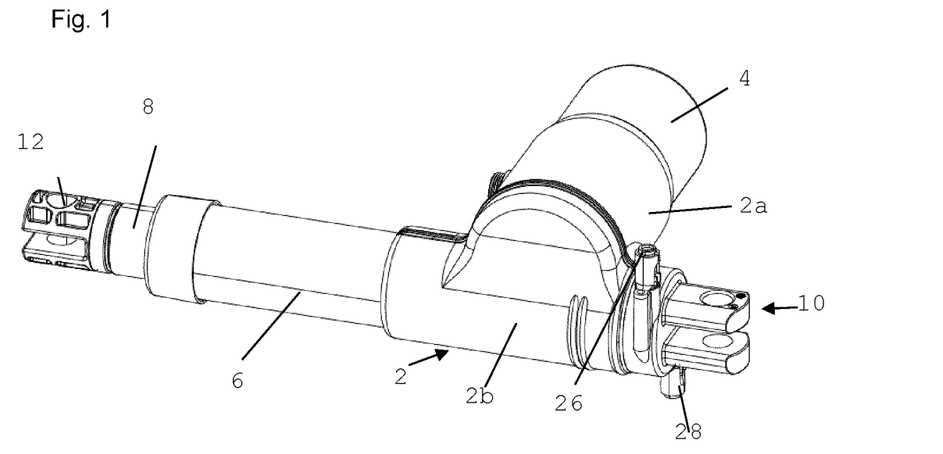
FIG. 1 shows an isometric front view of a linear drive according to the invention.

Referring to FIG. 1 the linear drive thus substantially comprises a two-part transmission housing 2, a motor housing 4 accommodated therein, with an electric motor in the motor housing and a guide tube 6 which extends in the longitudinal direction of the linear drive and in which a lift tube 8 is longitudinally displaceably accommodated and is displaceable between a retracted end position shown in FIG. 1 and a completely extended end position.

Respective fork heads 10, 12 are fixed at the front end of the lift tube and at the rear end of the housing. The linear drive can be fixed with those fork heads 10, 12 between two components which are displaceable relative to each other, for example for displacement of the pivotable head and foot ends of a bed with respect to a stationary frame. Preferably in that case the rear fork head 10 is connected to a transverse strut on the frame of the bed and the front fork head 12 is connected pivotably with a transverse strut to the foot or head portion fitted to the frame. Therefore by extension and retraction of the lift tube 8 in relation to the stationary guide tube 6 the foot or head portion is pivoted in relation to the stationary frame which forms a frame plane, that is to say it is lifted out of the frame plane.

The transmission housing 2 is divided or divisible and includes a rear housing portion 2a and a housing cover 2b which is connected thereto at a joining flange, a sealing groove being provided on the flange.

The rear housing portion 2a has a cylindrical receiving connecting piece for receiving the motor housing 4, that therefore extends transversely to the longitudinal direction of the linear drive.

In the present case therefore the motor housing 4 extends transversely to the longitudinal axis of the linear drive.

As can be seen from FIG. 1 the fork head 10 has a receiving connecting piece 10b which is provided by an end wall of the fork head 10 in the opposite direction to the fork head and from which entry connecting pieces 10d, 10e for receiving the Bowden cable holders 26, 28 extend tangentially relative to the outer peripheral surface and transversely relative to the longitudinal axis of that receiving connecting piece 10b, or from which the Bowden cable holders 26, 28 project, more specifically a respective Bowden cable holder 26 upwardly and the other Bowden cable holder 28 in the opposite direction downwardly relative to the first one.

Figure 2:
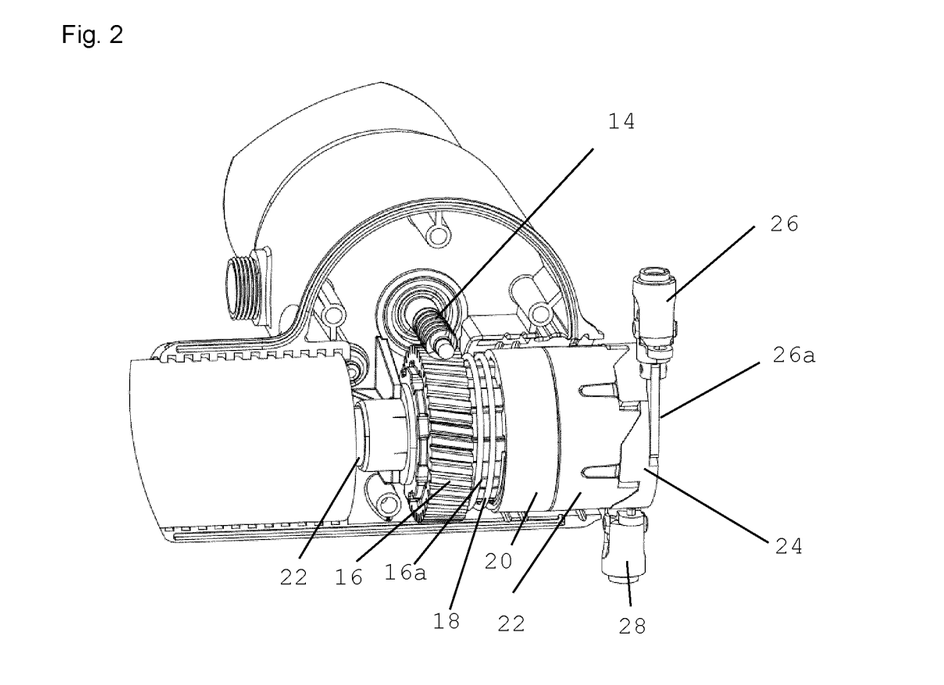
FIG. 2 shows an enlarged isometric front view of the rear end of the linear drive with the housing cover taken off and the fork head removed.

FIG. 2 shows an enlarged perspective front view of the transmission arranged in the transmission housing 2, with the housing cover 2b and the fork head 10 removed. The shaft driven by the electric motor with the spindle 14 thereon projects transversely into the transmission housing and meshes with a worm gear 16 which has a splined shaft connection 16a formed in one piece laterally beside the actual worm gear with the tooth flanks. Arranged on that splined shaft connection 16a is a compression spring 18 which acts on a clutch sleeve 20 which is carried non-rotatably and longitudinally displaceably on the splined shaft connection 16a and which internally has a splined shaft structure complementary to that of the splined shaft connection 16a.

Actuation of the clutch sleeve 20 for disengagement in an emergency situation, that is to say for emergency release, is effected by way of the clutch actuation according to the invention, in the present case including a slide sleeve 22 which acts internally on the clutch sleeve 20 and is arranged axially displaceably but non-rotatably and on which the rotatable but axially fixed rotary sleeve 24 externally acts.

The two Bowden cable holders 26, 28 are rotatably connected at the outer end of that rotary sleeve 24 in diametrally opposite relationship and extending tangentially relative to the periphery of the rotary sleeve. Steel cables with terminal cable thimbles (not shown) can be inserted or snap-fitted into those Bowden cable holders 26, 28.

Figure 3:
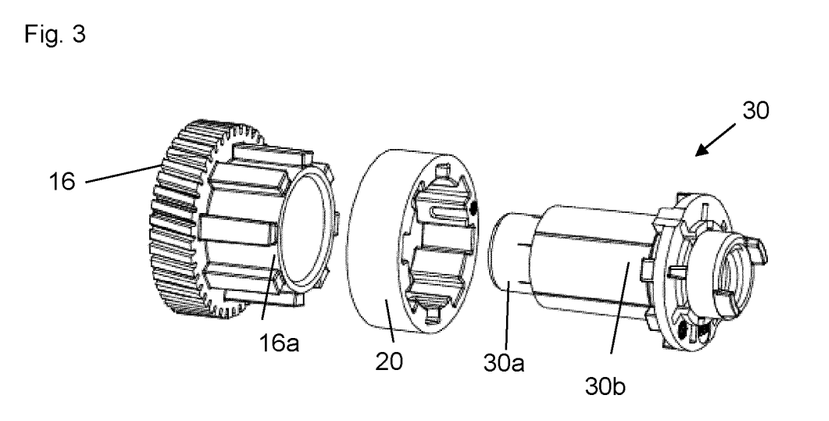
FIG. 3 shows an isometric exploded view of the arrangement including worm gear, clutch and spindle holder.

FIG. 3 shows an exploded view of the assembly comprising the worm gear 16 with the splined shaft connection 16a formed thereon and the compression spring 18 carried on that splined shaft connection 16a. In addition pushed on to the splined shaft connection 16a is the clutch sleeve 20 which has an inner splined shaft structure of a complementary configuration to that of the splined shaft connection 16a.

At the end the hollow-cylindrical spindle holder 30 in which the spindle 32 is non-rotatably accommodated is fitted into the outer rear end of the splined shaft connection 16a. At the rear end which therefore faces away from the clutch sleeve 20 the spindle holder 30 has a splined shaft flange 30b which projects outwardly radially from the hollow-cylindrical peripheral surface of the central spindle connection 30a for non-rotatably receiving the spindle 32 and at the inside of which, that is directly directed towards the clutch sleeve 20, there is also a splined shaft structure of a complementary configuration to the shaft structure at the splined shaft connection 16a of the worm gear 16.

Figure 4:
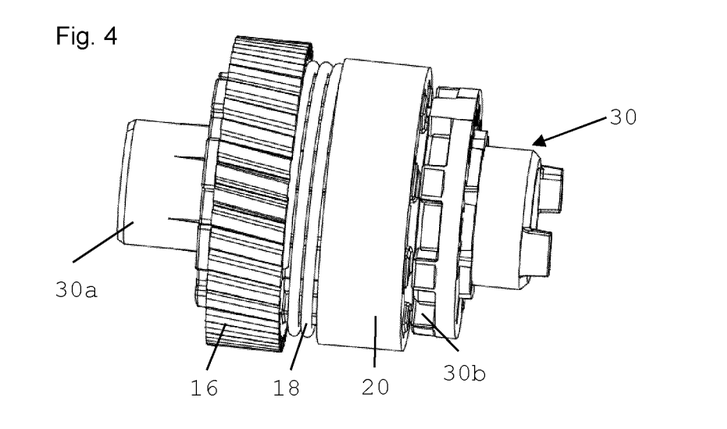
FIG. 4 shows an enlarged perspective plan view of the arrangement shown in FIG. 3 in the uncoupled position (disengaged)

FIG. 4 shows an enlarged plan view of those FIG. 3 elements in the uncoupled position in which therefore the clutch sleeve 20 releases the splined shaft flange 30b of the spindle holder 34 for providing for the desired free-running movement of the spindle 36.

Figure 5:
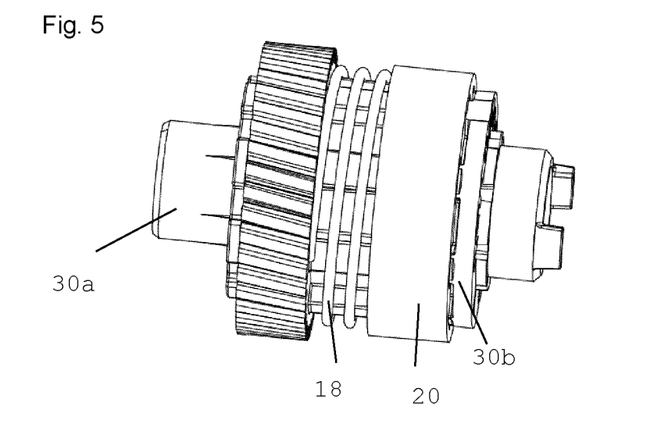
FIG. 5 shows the plan view of the arrangement as shown in FIG. 4 in the coupled state.

FIG. 5 in contrast shows the clutch sleeve 20 in the coupled position in which therefore the sleeve 20 non-rotatably connects the splined shaft connection 16a of the worm gear to the spindle holder 34, that is to say it is pressed by the compression spring 18 on to the splined shaft flange 30b of the spindle holder 30.

The slide sleeve 22 is fixed non-rotatably but displaceably in the longitudinal direction of the clutch arrangement and therefore acts with the internal end face on the clutch sleeve 20 to uncouple same. The slide sleeve 22 has a plurality of, in the present case 6, axially projecting run-on bevels 22a which are peripherally equidistantly spaced at the outer end face which is therefore facing towards the rotary sleeve 24. At the inside facing towards the slide sleeve 22 the rotary sleeve 24 has run-on bevels 24a of the rotary sleeve 24, that are of a complementary configuration to those run-on bevels 22a of the slide sleeve, so that in the installed position the rotary sleeve 24 and the slide sleeve 22 bear against each other or engage into each other so that the end faces of the slide sleeve 22 and the rotary sleeve 24 bear against each other in planar relationship in the rest position. Rotation of the rotary sleeve 24 about the longitudinal axis in the clockwise direction therefore provides that the complementary run-on bevels 22a, 24a run against each other and thus cause axial displacement of the slide sleeve 22. The slide sleeve 22 bears with its inner end face against the end face of the clutch sleeve 20 and is of such a geometrical configuration that at the same time it projects beyond the splined shaft flange 34b of the spindle sleeve 34 or internally engages same.

Figure 6:
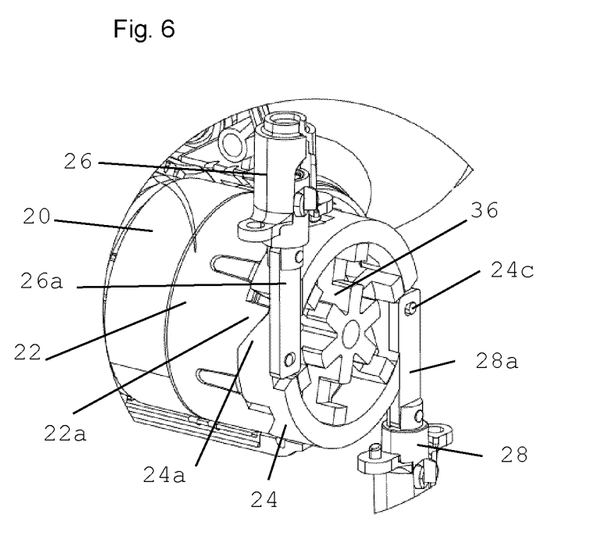
FIG. 6 shows an isometric enlarged view of the clutch actuation according to the invention with the fork head removed.

Referring to FIG. 6 at the rear outer end face the rotary sleeve 24 in diametrally opposite relationship has two recesses 24b into which the flat arms 26a, 28a of the Bowden cable holders 26, 28 can be so inserted that the external surface of those arms terminates with the external end face of the rotary sleeve 24 and the rotary sleeve 24 thus terminates in planar relationship with the end face of the fork head 10, at which the forks are externally arranged. The arms 26a, 28a of the Bowden cable holders 26, 28 are connected rotatably by way of pins 24c to the end of the rotary sleeve 24, as can be particularly clearly seen from the enlarged view in FIG. 6.

Figure 7:
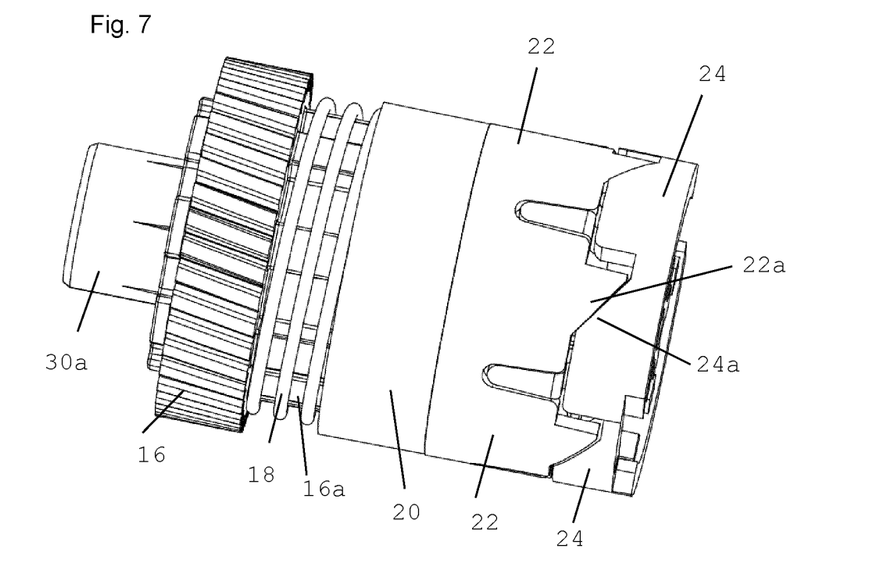
FIG. 7 shows an enlarged isometric plan view of the arrangement including worm gear, clutch, spindle holder and the clutch actuation in the coupled position.

FIG. 7 shows the clutch actuation in the coupled rest position in which the slide sleeve 22 bears externally against the rotary sleeve 24, wherein the run-on bevels 22a, 24a of the slide sleeve 22 and the rotary sleeve 24 bear against each other over the full area so that the slide sleeve 22 and the rotary sleeve 24 bear against each other at their ends without any spacing.

Figure 8:
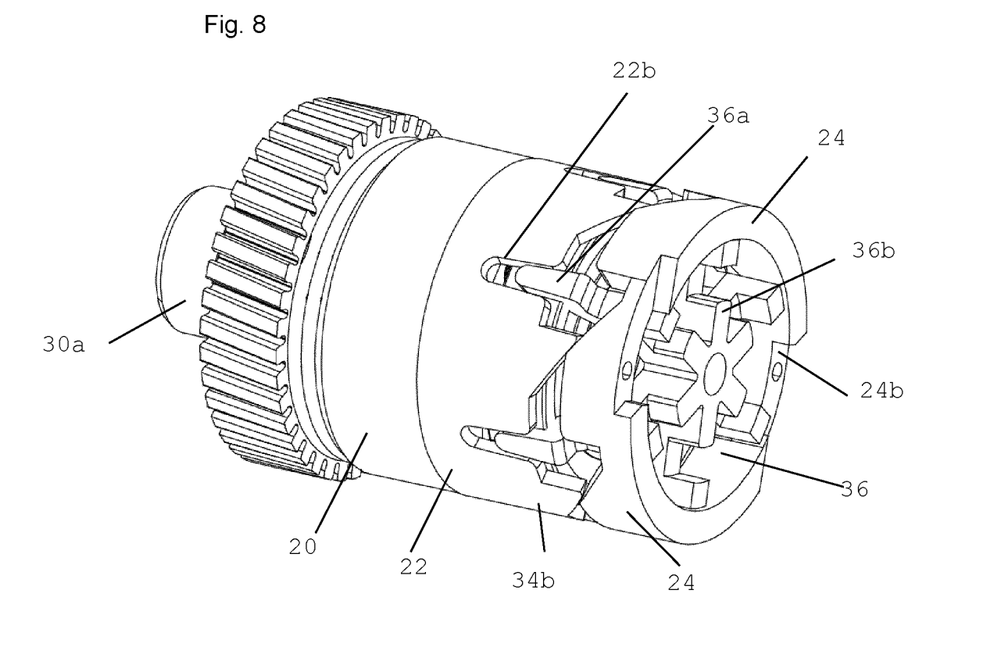
FIG. 8 shows an enlarged isometric view of the arrangement of FIG. 7 from the rear in the uncoupled position.

FIG. 8 shows the arrangement of FIG. 7 however in the uncoupled emergency position after rotation of the rotary sleeve 24 in the counter-clockwise direction by a Bowden cable holder 26, 28 so that the run-on bevel surfaces 22a, 24a ran against each other and the slide sleeve 22 was displaced axially inwardly to the clutch sleeve 20.

In that case the slide sleeve 22 engages over the splined shaft flange 30b of the spindle holder 30 externally and is displaced over same.

Figure 9:
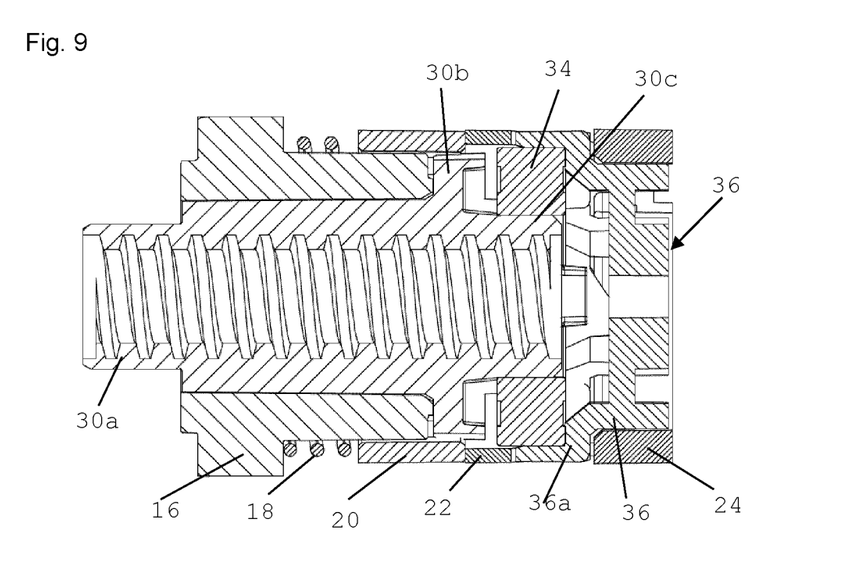
FIG. 9 shows an enlarged longitudinal section of the arrangement including worm gear, clutch, spindle holder, bearing, bearing holder and clutch actuation including slide sleeve and rotary sleeve.

FIG. 9 shows a longitudinal section of the arrangement including the worm gear, the slide sleeve 20 arranged on the splined shaft connection 16a of the worm gear 16, the spindle holder 30 fitted into the rear end of worm gear 16, the rolling bearing 34 which is fitted on the rear bearing seat 30c of the spindle holder 30 and which is externally embraced by the bearing seat of the bearing holder 36.

At the rear end remote from the clutch sleeve 20 the slide sleeve 22 includes six peripherally equally spaced bearing finger recesses 22b into which the complementary bearing fingers 36a of the bearing holder engage or fit. The peripherally equidistantly spaced bearing fingers 36a form the peripheral bearing seat which defines an axial abutment rearwardly and a radial abutment outwardly. In the installed position the bearing fingers 36a terminate with the outside of the slide sleeve 22 or fit in the complementary bearing finger recesses 22b of the slide sleeve 22.

A connecting portion rearwardly adjoins the bearing seat of the bearing holder 36, that is formed by the bearing fingers 36a. The connecting portion is of a reduced outside diameter with respect to the bearing seat and in the present case has a plurality of transverse struts 36a extending transversely relative to the longitudinal axis of the bearing holder, with intermediate spaces formed between them, into which in the installed condition projections engage into the fork head at the inside of the end of the fork head and thus fix the bearing holder 36.

Figure 10:
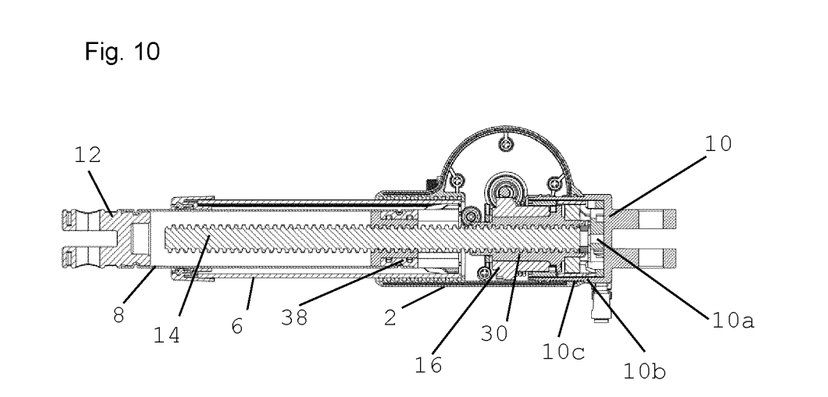
FIG. 10 shows a longitudinal section of the linear drive of FIG. 10 through the center of the guide tube.

FIG. 10 shows an enlarged longitudinal section of the linear drive through the longitudinal axis of the guide tube 6 and the lift tube 8. It can be clearly seen here that the fork head 10 includes a rear end wall, from which two fixing legs for receiving a bar or the like extend outwardly. In the opposite direction that fork head includes an integrally formed hollow-cylindrical receiving connecting piece 10b which is adapted in length for embracingly receiving the clutch actuation and the clutch sleeve 20. Externally that receiving connecting piece 10b has outwardly projecting ribs 10c which are spaced from each other in the longitudinal direction of the receiving connecting piece 10b and engage into complementary grooves or channels at the inside of the rear end of the transmission housing 2 for positively locking connection or alternatively for latching connection of the fork head 10 to the rear end of the transmission housing 2.

The transmission thus drives the spindle 14 with a trapezoidal thread, on which a spindle nut 38 runs between the rear retraction position shown in FIG. 10 and an extended extension position in which the lift tube 8 with the front fork head 10 is extended completely from the guide tube 6.

Figure 11:
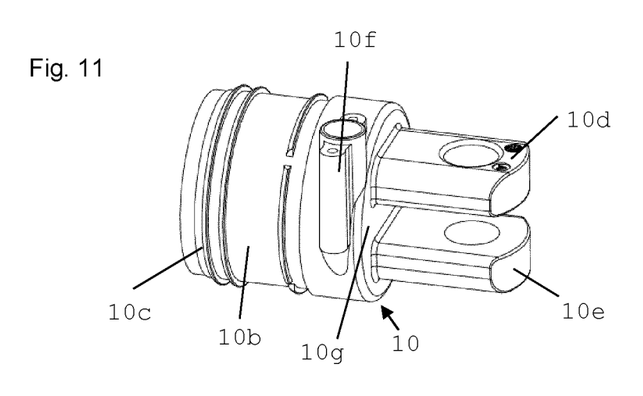
FIG. 11 shows an isometric side view of the fork head 10 from the rear, adapted to receive the clutch actuation.

FIG. 11 shows an isometric side view of the fork head 10 from the rear, adapted to receive the clutch actuation. The fork head 10 includes an end wall 10g which extends transversely to the longitudinal axis of the fork head 10 and from which two forks 10d, 10e extend rearwardly and from which the hollow-cylindrical receiving connecting piece 10b extends in the opposite direction to those forks 10d, 10e, the connecting piece 10b having a plurality of ribs formed on the external peripheral surface thereof in mutually spaced relationship. Beside same it is also possible here to particularly clearly see the entry connecting piece 10f, the longitudinal axis of which extends transversely to the longitudinal axis of the receiving connecting piece 10b tangentially to the outer peripheral surface thereof and into which the Bowden cable holder 26 can be fitted, which is connected rotatably by way of the arm 26 to the rotary ring 24 of the clutch actuation.

LIST OF REFERENCES 2 transmission housing
2a rear housing cover 4 motor housing
6 guide tube
8 lift tube
10, 12 fork head
10a projection
10b receiving connecting piece
10c ribs
10d, 10e forks
10f entry connecting piece
10g end wall
14 spindle
16 worm gear
16a splined shaft connection
18 compression spring
20 clutch sleeve
22 slide sleeve
22a run-on bevel
22b bearing finger recesses
24 rotary sleeve
24a run-on bevel
24b recess
26 cable holder
26a arm
28 cable holder
28a arm
30 spindle holder
30a spindle connection
30b splined shaft flange
30c bearing seat
32 spindle
34 rolling bearing
36 bearing holder
36a bearing finger
36b transverse strut
38 spindle nut

What is claimed is:

1. A linear drive comprising:
a transmission housing,
an electric motor which is accommodated with the transmission housing and drives a shaft with a worm which, in turn, meshes with a worm gear which is non-rotatably connectable to a clutch to a spindle holder to which there is non-rotatably connected a spindle on which runs a spindle nut which is adjustable in a guide tube longitudinally displaceably between a retracted rear end position and an extended front end position and is connected to a lift tube,
wherein the clutch is biased by a spring,
wherein the clutch is displaceable by a clutch actuation between a coupled position in which the clutch non-rotatably connects the worm gear to the spindle holder and an uncoupled position in which the clutch releases the spindle holder,
wherein the clutch actuation includes a slide element which bears against the clutch and which is arranged non-rotatably but axially displaceably and a rotary element which is axially fixed but rotatable about an axis of rotation engages the slide element at an outside facing away from the clutch, run-on bevels of a complementary configuration are provided between the slide element and the rotary element, and there is provided a pulling means with which the rotary element is actuable, and
wherein the slide element is axially displaceably in relation to the rotary element.

2. The linear drive as set forth in claim 1, wherein the clutch is in a form of a clutch sleeve.

3. The linear drive as set forth in claim 2, wherein the slide element and the rotary element are of a ring-shaped configuration or sleeve-shaped configuration.

4. The linear drive as set forth in claim 3, wherein the rotary element is in a form of a rotary ring and the rotary ring externally has two pulling means holders in diametrically opposite relationship.

5. The linear drive as set forth in claim 1, wherein at least one Bowden cable holder is rotatably fitted to the rotary element.

6. The linear drive as set forth in claim 5, wherein the rotary element has a recess for the at least one Bowden cable holder.

7. The linear drive as set forth in claim 1, wherein the clutch actuation is arranged in a fork head.

8. The linear drive as set forth in claim 7, wherein the fork head has a receiving connecting piece extending from an end wall of the fork head in an opposite direction to forks provided on the fork head.

9. The linear drive as set forth in claim 7, wherein the fork head has a feed opening for a connection of a Bowden cable holder.

10. The linear drive as set forth in 7, wherein the fork head has two diametrically oppositely disposed entry connecting pieces to receive Bowden cable holders which project in diametrally opposite relationship tangentially laterally from a peripheral surface of the fork head.

11. The linear drive as set forth in claim 1, wherein the spindle holder has a bearing seat on which an inner race of a bearing sits, an outer race of the bearing sits in a bearing seat of a bearing holder which mounts the bearing in a fork head or in the transmission housing and that the bearing holder is arranged within the clutch actuation.

12. The linear drive as set forth in claim 11, wherein the bearing seat of the bearing holder includes an axial abutment acting axially on the bearing.

13. The linear drive as set forth in claim 11, wherein the bearing seat of the bearing holder has a bearing step against which the outer race of the bearing bears radially externally and axially at an end.

14. The linear drive as set forth in claim 11, wherein the bearing seat is interrupted to form bearing fingers which are formed peripherally separatedly from each other.

15. The linear drive as set forth in claim 14, wherein the slide element has bearing finger recesses which are provided at an outside facing towards the rotary element to receive the bearing fingers and into which the bearing fingers engage.

16. The linear drive as set forth in claim 15, wherein the bearing holder has six peripherally spaced bearing fingers which engage into six slot-like bearing finger recesses of complementary configuration at the outside of the slide element.

17. The linear drive as set forth in claim 11, wherein the bearing holder has a connecting portion to connect to the fork head or the transmission housing.

18. The linear drive as set forth in claim 17, wherein the connecting region of the bearing holder has a plurality of transverse struts which extend transversely relative to a longitudinal axis of the bearing holder, with intermediate spaces provided between them, into which pins or projections at an inside of an end of the fork head engage in an installed position.

* * * * *